US008986545B2

(12) United States Patent
Kolhatkar

(10) Patent No.: US 8,986,545 B2
(45) Date of Patent: Mar. 24, 2015

(54) IN SITU BIOREMEDIATION OF CONTAMINATED GROUNDWATER USING ELECTRON ACCEPTOR SALTS

(75) Inventor: Ravindra Vasant Kolhatkar, Katy, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 227 days.

(21) Appl. No.: 13/451,083

(22) Filed: Apr. 19, 2012

(65) Prior Publication Data

US 2013/0015126 A1     Jan. 17, 2013

Related U.S. Application Data

(60) Provisional application No. 61/486,614, filed on May 16, 2011.

(51) Int. Cl.
| | |
|---|---|
| *C02F 3/00* | (2006.01) |
| *C02F 3/28* | (2006.01) |
| *B09C 1/00* | (2006.01) |
| *C02F 101/32* | (2006.01) |

(52) U.S. Cl.
CPC . *C02F 3/28* (2013.01); *B09C 1/002* (2013.01); *C02F 2101/32* (2013.01); *C02F 2101/322* (2013.01); *C02F 2209/15* (2013.01); *C02F 2209/19* (2013.01); *C02F 2305/06* (2013.01)
USPC ........................................ 210/610; 210/747.8

(58) Field of Classification Search
USPC .............................................. 210/747.8, 610
See application file for complete search history.

(56) References Cited

U.S. PATENT DOCUMENTS

| | | | |
|---|---|---|---|
| 3,962,134 A * | 6/1976 | Cobb | 502/202 |
| 5,006,250 A | 4/1991 | Roberts et al. | |
| 5,277,815 A * | 1/1994 | Beeman | 210/605 |
| 5,833,855 A | 11/1998 | Saunders | |
| 5,922,204 A | 7/1999 | Hunter et al. | |
| 5,942,117 A | 8/1999 | Hunter et al. | |
| 6,251,657 B1 | 6/2001 | Hunter et al. | |
| 6,365,051 B1 * | 4/2002 | Bader | 210/640 |
| 6,497,534 B1 * | 12/2002 | McCoy | 405/128.5 |
| 6,719,902 B1 | 4/2004 | Alvarez et al. | |
| 6,787,034 B2 | 9/2004 | Noland et al. | |
| 7,030,287 B2 * | 4/2006 | Murasawa et al. | 210/610 |
| 7,138,060 B2 | 11/2006 | Cuthbertson | |

(Continued)

FOREIGN PATENT DOCUMENTS

CA          2008870 A1     7/1991

OTHER PUBLICATIONS

Hutchins et al., Combined Laboratory/Field Study on the Use of Nitrate for in Situ Bioremediation of a Fuel-Contaminated Aquifer, Environmental Science & Technology, vol. 32, No. 12, 1998, pp. 1832-1840.

(Continued)

*Primary Examiner* — Chester Barry
(74) *Attorney, Agent, or Firm* — Pillsbury Winthrop Shaw Pittman, LLP

(57) ABSTRACT

A process is provided for bioremediating petroleum hydrocarbon contaminated groundwater by applying at least one electron acceptor salt to a ground surface overlying the contaminated groundwater. The process includes identifying characteristics of the aquifer, in which the contaminated groundwater is found, to enable treatment of aquifers at a range of depths below the ground surface.

25 Claims, 4 Drawing Sheets

(56) References Cited

U.S. PATENT DOCUMENTS

| | | |
|---|---|---|
| 7,407,583 B2 * | 8/2008 | Mailath et al. ............... 210/610 |
| 7,497,948 B2 | 3/2009 | Chowdhury et al. |
| 2002/0178772 A1 | 12/2002 | Hince |
| 2003/0143030 A1 | 7/2003 | Greenberg |
| 2004/0007524 A1 | 1/2004 | Noland et al. |
| 2004/0014196 A1 | 1/2004 | Coates et al. |
| 2006/0219631 A1 * | 10/2006 | Cuthbertson ............... 210/610 |
| 2007/0144965 A1 * | 6/2007 | Morris et al. ............... 210/605 |
| 2007/0297858 A1 | 12/2007 | Imbrie |
| 2012/0193569 A1 * | 8/2012 | Koefod ......................... 252/70 |

OTHER PUBLICATIONS

Davis et al., The Variability and Intrinsic Remediation of a BTEX Plume in Anaerobic Sulphate-Rich Groundwater, Journal of Contaminant Hydrology, vol. 36, Issues 3-4, Mar. 1999, pp. 265-290.

Sublette et al., Monitoring Subsurface Microbial Ecology in a Sulfate-Amended, Gasoline-Contaminated Aquifer, Ground Water Monitoring & Remediation vol. 26, No. 2, Spring 2006, pp. 70-78.

Farhadian et al., In Situ Bioremediation of Monoaromatic Pollutants in Groundwater: A Review, Bioresource Technology, vol. 99, Issue 13, Sep. 2008, pp. 5296-5308.

Kolhatkar et al., Harnessing Sulfate-Reducing Microbial Ecology to Enhance Attenuation of Dissolved BTEX at Two Petroleum-Impacted Sites, Ecological Chemistry and Engineering A, vol. 15, No. 6, 2008, pp. 535-549.

Bruce et al., Illinois Sulfate Pilot Test to Enhance Anaerobic Degradation of Hydrocarbons, The Professional Geologist, vol. 47, No. 5, Sep./Oct. 2010, pp. 16-23.

Anneser et al., High-Resolution Monitoring of Biogeochemical Gradients in a Tar Oil-Contaminated Aquifer, Applied Geochemistry, vol. 23, Issue 6, Jun. 2008, pp. 1715-1730.

Bouwer et al., A Slug Test for Determining Hydraulic Conductivity of Unconfined Aquifers With Completely or Partially Penetrating Wells, Water Resources Research, vol. 23, No. 3, Jun. 1976, pp. 423-428.

Cunningham et al., Enhanced In Situ Bioremediation of BTEX-Contaminated Groundwater by Combined Injection of Nitrate and Sulfate, Environmental Science & Technology, vol. 35, No. 8, 2001, pp. 1663-1670.

Dou et al., Anaerobic BTEX Biodegradation Linked to Nitrate and Sulfate Reduction, Journal of Hazardous Materials, vol. 151, Issues 2-3, Mar. 1, 2008, pp. 720-729.

Vroblesky et al., Influence of Electron Donor on the Minimum Sulfate Concentration Required for Sulfate Reduction in a Petroleum Hydrocarbon-Contaminated Aquifer, Environmental Science & Technology, vol. 30, Issue 4, 1996, pp. 1377-1381.

Anderson et al., Anaerobic Bioremediation of Benzene Under Sulfate-Reducing Conditions in a Petroleum-Contaminated Aquifer, Environmental Science & Technology, vol. 34, Issue 413, 2000, pp. 2261-2266.

Van Stempvoort et al., Seasonal Recharge and Replenishment of Sulfate Associated with Biodegredation of a Hydrocarbon Plume, Ground Water Monitoring & Remediation, vol. 27, No. 4., Fall 2007, pp. 110-121.

Scholl et al., Recharge Processes Drive Sulfate Reduction in an Alluvial Aquifer Contaminated with Landfill Leachate, Journal of Contaminant Hydrology, vol. 86, Issues 3-4, Aug. 10, 2006, pp. 239-261.

Lunardini et al., Enhanced Anaerobic Bioremediation of Petroleum Hydrocarbons in Groundwater Using Sulfate, Proceedings of the Seventh International In Situ and On-Site Bioremediation Symposium, Jun. 2-5, 2003, Paper E38.

Wilson et al., Monitored Natural Attenuation of Tertiary Butyl Alcohol (TBA) in Ground Water at Gasoline Spill Sites, National Risk Management Research Laboratory, Office of Research and Development, U.S. Environmental Protection Agency, Oct. 2007.

Van Stempvoort et al., Bacterial Sulfate Reduction in Biodegradation of Hydrocarbons in Low-Temperature, High-Sulfate Groundwater, Western Canada.

International Patent Search and Written Opinion regarding PCT/US2012/034246, mailed Jul. 11, 2012, 11 pages.

Jeffrey A. Cunningham et al: "Enhanced anaerobic bioremediation of groundwater contaminated by fuel hydrocarbons at Seal Beach, California," Biodegradation, Kluwer Academic Publishers, DO, vol. 11, No. 2-3, Mar. 1, 2000, pp. 159-170, XP019231853, ISSN: 1572-9729, DOI: 10,1023/A:1011167709913, pp. 169-170: "Conclusions," 18 pages.

R.T. Anderson et al: "Anaerobic Bioremediation of Benzene under Sulfate-Reducing Conditions in a Petroleum-Contaminated Aquifer," Environ. Sci. Technol., vol. 34, No. 11, 2000, pp. 2261-2266, XP002678543, American Chemical Society, p. 2265: Implications for Anaerobic Bioremediation of Benzene, 6 pages.

Chinese Office Action dated Oct. 24, 2014 for Appln. No. 201280031094.8.

* cited by examiner

Groundwater Contaminants Prior to Sulfate Addition

Relationship between Monthly Rainfall and Groundwater Level

IN SITU BIOREMEDIATION OF CONTAMINATED GROUNDWATER USING ELECTRON ACCEPTOR SALTS

CROSS REFERENCE TO RELATED APPLICATION

This application claims the benefit of U.S. patent application Ser. No. 61/486,614, filed on May 16, 2011, the entire contents of which is incorporated herein by reference.

BACKGROUND OF THE INVENTION

The present invention relates to a new and improved bioremediation process for anaerobic biodegradation, detoxification and transformation of organic compounds in contaminated aquifers. Bioremediation is a process of either promoting or introducing organisms, plants or other flora or fauna to break down or use the organic compounds.

During biodegradation of petroleum hydrocarbons including BTEX compounds (which include benzene, toluene, ethylbenzene and xylene isomers) in groundwater, micro-organisms use dissolved BTEX as an electron donor and rely on a variety of terminal electron accepting processes (TEAP) such as aerobic oxidation, nitrate reduction, iron (III) reduction and sulfate reduction to generate energy and produce new biomass. Aerobic oxidation provides the most potent energy source for the micro-organisms. However, dissolved oxygen solubility in water is relatively low, and in the vicinity of a BTEX source, dissolved oxygen is rapidly consumed, resulting in anaerobic groundwater conditions. Under these conditions electron accepting processes with nitrate and sulfate become more important. When all the soluble electron acceptor salts are depleted, groundwater conditions become conducive to fermentation and methane is generated (methanogenesis). A number of laboratory and field studies have demonstrated that BTEX compounds are susceptible to anaerobic biodegradation under nitrate and sulfate reducing conditions.

Conventional engineering approaches to clean-up BTEX-impacted groundwater often rely on adding oxygen to stimulate biological breakdown of dissolved BTEX. This can be very effective at sites where conditions are conducive to distribution of oxygen into the impacted groundwater. However, oxygen addition under reducing conditions is very inefficient both due to its limited water solubility and also due to a number of chemical processes that rapidly consume oxygen (e.g. oxidation of reduced minerals and other non-target compounds).

Biodegradation of BTEX by native sulfate reducing micro-organisms consumes the naturally occurring sulfate in petroleum-impacted aquifers. Also, sulfate reduction is very widespread in gasoline impacted groundwater and that many plumes, which contain dissolved organics, are depleted in sulfate. As such, there is a great potential to exploit this process and expedite clean-up of petroleum impacted groundwater if sulfate can be added to the impacted groundwater. A number of field studies have demonstrated enhanced biodegradation of dissolved BTEX following sulfate addition to groundwater. At other sites, where nitrate is the limiting electron acceptor, field scale applications using nitrate addition have been shown to be effective in reducing the BTEX concentrations in soil and groundwater.

However, addition of a limiting electron acceptor salt via injection wells or infiltration galleries has limited effectiveness in remediating contaminated groundwater. Distribution and delivery using these methods is largely controlled by site geology and is constrained by the geometry of the injection well layout. Furthermore, electron acceptor salt injection into the aquifer does not address hydrocarbon impacts in the vadose zone between the top of the ground surface and the water table. For treating larger areas, the number of wells and addition events can be cost prohibitive and the treatment may be localized in the area near the injection. In addition, the periodic injection of the electron acceptor salt may cause changes in the subsurface conditions (e.g. electrical conductivity and possibly pH) that may not be conducive to optimal biological response as the subsurface microbial populations are constantly adapting to these changes.

The need remains for a more stable, uniform and cost-effective electron acceptor salt delivery mechanism to achieve better treatment efficiency of contaminated groundwater.

SUMMARY OF THE INVENTION

Accordingly, the present invention provides a process for remediating contaminated groundwater in a subsurface aquifer, comprising applying at least one electron acceptor salt to a ground surface overlying the contaminated groundwater. In one embodiment, the process is effective for bioremediating contaminated groundwater that ranges in depth from 5 feet to 25 feet below ground surface. In one embodiment, the process is effective for bioremediating contaminated groundwater at these depths when the aquifer has a hydraulic conductivity within the range of $10^{-3}$ cm/sec to 1 cm/sec.

In some applications of the process, at least, local conditions are useful in establishing suitable treatment levels. In one embodiment, the invention provides a process for bioremediating contaminated groundwater in a subsurface aquifer which includes both contaminated groundwater and uncontaminated groundwater. Under these conditions, the process comprises determining an electron acceptor content of a sample of the uncontaminated groundwater; determining an electron acceptor content of a sample of the contaminated groundwater; and applying at least one electron acceptor salt to the ground surface overlying the contaminated groundwater in sufficient quantity to increase the salt concentration of the contaminated groundwater to at least 20 mg per liter of the contaminated groundwater. In another embodiment, the process comprises increasing the salt concentration of the contaminated groundwater to at least that of the salt concentration of the uncontaminated groundwater. In one embodiment, the electron acceptor salt is sulfate. In one such embodiment, the electron acceptor salt is gypsum. In another such embodiment, the electron acceptor salt is heptahydrate epsomite. In another embodiment, the electron acceptor salt is nitrate.

In one embodiment, the invention provides a process for bioremediating contaminated groundwater in a subsurface aquifer, comprising identifying an aquifer with contaminated groundwater which contains less than 20 mg of an electron acceptor per liter of contaminated groundwater, in an aquifer having a hydraulic conductivity within the range from $10^{-3}$ cm/sec to 1 cm/sec, the contaminated groundwater being at a depth in the range from 5 feet to 25 feet below the ground surface; selecting a ground surface overlying the contaminated groundwater; and supplying at least one electron acceptor salt to the ground surface.

DETAILED DESCRIPTION OF THE INVENTION

Figure 1:
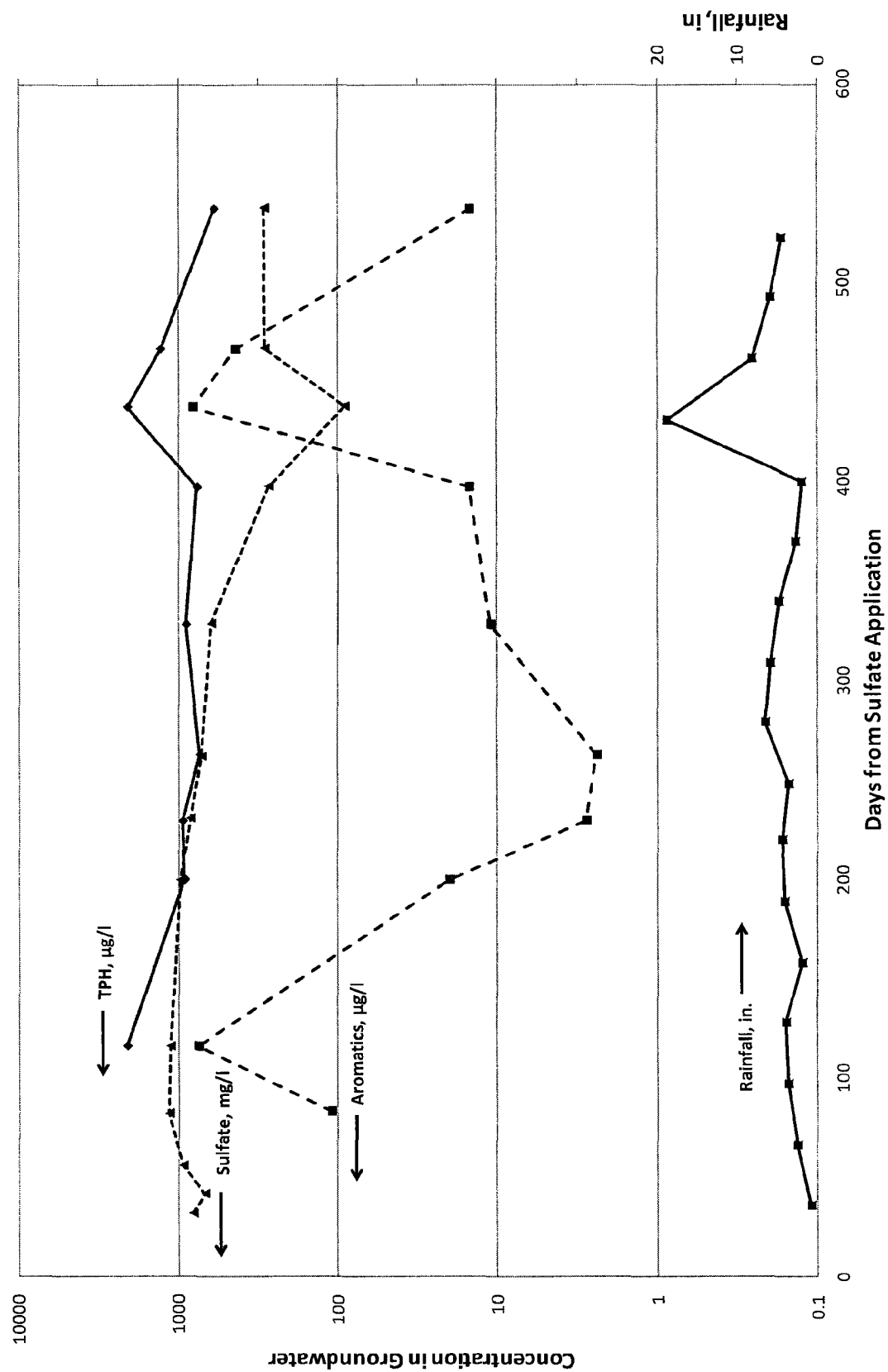
FIG. 1 illustrates the changes in groundwater composition in a shallow well following application of sulfate to the ground surface overlying contaminated groundwater.

The contaminated groundwater which is treated as described herein contains at least one contaminant that is susceptible to biodegradation by sulfate or nitrate reducing micro-organisms. This contaminated groundwater is generally located within an aquifer, at least a portion of which is contaminated with petroleum hydrocarbons that are toxic or are at unacceptable or undesirable concentrations in the groundwater. Often, the contaminant compounds are present in the groundwater as the result of human activity.

As used herein, "ground surface" refers to the surface of the earth upon which man and his surroundings naturally rest or move; "groundwater" refers to subterranean water found in the surface soil of the crust of the earth; "subterranean" refers to existing, lying, or situated below the surface of the earth; "aquifer" refers to a water-bearing subterranean stratum in which the groundwater occurs; "plume" of contaminated groundwater represents an area of groundwater within the aquifer that contains one or more contaminants in concentrations above acceptable levels; the "vadose" zone extends between the ground surface and the top of the water level in the aquifer.

As used herein, a contaminant is any chemical substance or substances that may be toxic or have otherwise adverse effects on human health and/or the environment, and may be present above regulatory criteria. Typical contaminants include, for example, volatile organic compounds (VOCs); semivolatile organic compounds (SVOCs), including a broad group of polycyclic aromatic hydrocarbons; and fuels or petroleum products such as crude oil, natural gas condensate, gasoline, diesel, fuel oil and jet fuels and their constituent compounds. Fuel or petroleum contaminants include aromatic and oxygenated compounds. Included in aromatic contaminants are benzene, toluene, ethylbenzene, xylene isomers which are herein identified collectively as BTEX and higher molecular weight alkylbenzenes. Included in oxygenated contaminants are methyl tert-butyl ether (MTBE), tert-amyl methyl ether (TAME), tert-butyl alcohol (TBA), ethyl ether, methanol, ethanol and various biodiesel formulations.

Benzene, toluene, ethylbenzene, xylenes isomers (BTEX) and higher molecular weight alkylbenzenes are examples of monoaromatic hydrocarbons that have been found in sites polluted by oil production facilities, gasoline stations, bulk terminals, refineries and other facilities storing and handling petroleum products. Groundwater gets polluted by monoaromatic compounds due to release of petrol, gasoline, diesel, and other petroleum products from storage tanks and wastes from oil industries. These hydrocarbons have higher water solubility than other organic compounds that are present in gasoline such as aliphatics. Saturation solubility of benzene in water at ambient conditions is 1780 mg/l. Likewise, the saturation solubilities of toluene, ethyl benzene, and xylenes in water are 535, 152, and 167 mg/l, respectively. The effective solubility of the contaminant for a given petroleum product depends, at least in part, on the concentration of each of these contaminants in the fuel or product.

The amount of contaminant in groundwater that can be treated in the process covers a wide range, extending at least from the lower detection limit for a particular contaminant, up to and including the effective solubility of that particular contaminant at the pressure and temperature of the groundwater. In embodiments, the contaminated groundwater contains at least 1 mg of total BTEX per liter of groundwater. In one embodiment, the contaminated groundwater comprises in the range from 1 to 100 mg of total BTEX contaminant per liter of groundwater; in a second embodiment, in the range from 5 to 50 mg of total BTEX contaminant per liter of groundwater. The individual amounts of benzene or toluene or ethylbenzene or xylenes range from 0 to 100 wt. % of the total BTEX present in the contaminated groundwater.

Contaminated groundwater at a depth of 25 feet, or greater, below the ground surface may be bioremediated as described herein. The depth of groundwater that can be treated by the process is determined, at least in part, by the rate at which the electron acceptor salt migrates to the groundwater following the surface application. In embodiments, contaminated groundwater at a depth of up to 25 feet may be bioremediated as described herein. In one embodiment, the bioremediation process is available for contaminated groundwater at a depth within the range from 1 to 25 feet; in a second embodiment, within a range from 5 to 25 feet.

The contaminated groundwater generally occurs in an aquifer, some or all of which may be contaminated at some level. In embodiments, the contaminated groundwater that is treated as described herein exists as a plume of contamination within an aquifer of uncontaminated groundwater.

Bioremediation of the contaminated groundwater includes applying at least one electron acceptor salt to the ground surface overlying the contaminated groundwater. In one embodiment, the area of surface application approximates the area of the plume of contamination of the groundwater. Identifying the area of the plume may involve, for example, sampling the groundwater in wells drilled in various locations within the aquifer and analyzing the samples for contaminants. In embodiments, the ground surface for applying the electron acceptor salt is an open site, without paving and without buildings and other infrastructure. In other embodiments, the area of application is selected to take account of flow within the aquifer, or to take account of a source of the contamination, or to take account of reduced soil permeability (including paving, buildings and other infrastructure). In these cases, a smaller area of application may be suitable. There are also site-specific characteristics that may affect the application of the electron acceptor salt, including the need to cut or remove grass and brush and/or to till the soil before and/or after application.

In the present process, at least one electron acceptor salt is applied to a ground surface overlying contaminated groundwater that ranges in depth of up to 25 feet below the ground surface. Treating aquifers at this significantly increased depth is facilitated by soil formations having a specified hydraulic conductivity. Accordingly, the method provides a treatment option for bioremediating contaminated groundwater at depths of up to 25 feet in one embodiment; in a second embodiment, in the range in depth from 1 to 25 feet; and in a third embodiment, in the range in depth from 5 to 25 feet below the ground surface. In one embodiment, the groundwater treated as described herein occurs in an aquifer having a hydraulic conductivity of $10^{-3}$ cm/sec or higher; in a second embodiment, in the range of from $10^{-3}$ cm/sec to 1 cm/sec. Hydraulic conductivity may be determined, for example, using ASTM D5084-10: Standard Test Methods for Measurement of Hydraulic Conductivity of Saturated Porous Materials Using a Flexible Wall Permeameter.

Typical ranges of hydraulic conductivity of soils are shown in the table below.

| Soil Type | Range of Hydraulic Conductivity, cm/sec |
|---|---|
| Gravel | 0.1 to 100 |
| Clean Sand | $10^{-3}$ to 1 |
| Silty Sand | $10^{-5}$ to 0.1 |
| Silt, Loess | $10^{-7}$ to $10^{-3}$ |
| Glacial Till | $10^{-10}$ to $10^{-4}$ |

Contaminated groundwater is remediated by micro-organisms in both oxygen-rich and oxygen-lean environments. Bioremediation processes involving micro-organisms that use oxygen as an electron acceptor during destruction of the petroleum hydrocarbon contaminants generally produce carbon dioxide as a primary reaction product. Oxygen may be supplied to the contaminated groundwater as air, as a gas phase mixture of oxygen with another gas, or as an oxygen release compound such as hydrogen peroxide. The determination of dissolved oxygen in the contaminated groundwater is an indication of the likelihood that micro-organisms present in the contaminated groundwater will reduce contaminant levels. However, supplying sufficient oxygen to the contaminated groundwater to maintain aerobic conditions in the aquifer is often difficult and costly.

When the dissolved oxygen is depleted in the contaminated groundwater, anaerobic conditions, which are characterized by the absence of dissolved oxygen in the contaminated groundwater, begin to develop. Under these conditions, nitrate reducing bacteria and sulfate reducing bacteria use nitrate and sulfate as electron acceptors. When all the soluble electron acceptors are consumed, methanogenic micro-organisms may continue to produce methane and $CO_2$ as metabolic byproducts. A typical remediation mechanism involving nitrate or sulfate as an electron acceptor salt produces nitrogen or hydrogen sulfide, respectively, as reaction products. Under appropriate site conditions, at least some of the produced hydrogen sulfide reacts with Fe(II), which is present in the groundwater, as well as with any Fe(III) present in the soil, to form relatively insoluble FeS. Furthermore, a typical remediation mechanism producing $CO_2$ as one of the reaction products may cause an increase in the total alkalinity of the groundwater. Accordingly, in embodiments, analysis of sulfate, nitrate, dissolved Fe(II), dissolved methane and/or total alkalinity may be indicative of ongoing biological processes in the contaminated groundwater suitable for remediating contaminants.

In general, the electron acceptor salt in contaminated groundwater is significantly depleted prior to treatment. One method for analyzing the relative reduction of the electron acceptor salt in the contaminated groundwater involves sampling contaminated groundwater from within the plume of contamination in the aquifer, and also sampling uncontaminated groundwater from outside of the contamination plume. A comparison of the electron acceptor salt concentrations from the two locations provides a measure of the electron acceptor salt utilization due to micro-organism activity within the contaminated groundwater plume.

Thus, in general, untreated contaminated groundwater in an aquifer contains less of an electron acceptor salt than uncontaminated groundwater in the aquifer. In one embodiment, untreated contaminated groundwater contains less than 20 mg of electron acceptor salt per liter of contaminated groundwater. In a second embodiment, the electron acceptor salt concentration in the contaminated groundwater is below the detection limit for that electron acceptor salt.

In one embodiment, a site for bioremediating contaminated groundwater in a subsurface aquifer is selected on the basis of the appropriate groundwater geochemistry, and by evaluating the relationship between the historical groundwater depth and corresponding rainfall. A qualitative relationship between groundwater depth and rainfall suggests a connection between the rainfall event at the surface and the groundwater (thereby suggesting that the land application has an acceptable probability of getting the electron acceptor-laden water to infiltrate to the groundwater).

In one embodiment, the electron acceptor salt that is applied to the ground surface includes sulfate, e.g. $SO_4^{2-}$, generally in the form of at least one soluble sulfate salt. Inorganic sulfate salts that are at least partially soluble in water or in aqueous solution are suitable sources of the electron acceptor salt. Thus, sulfate salts such as sodium sulfate, calcium sulfate, magnesium sulfate and iron sulfate, or sulfur-containing materials that can be converted into at least one of these sulfate salts after application to the ground surface, are suitable sources of sulfate. Gypsum is a calcium sulfate containing material. In its natural state, it is often composed of calcium sulfate dihydrate, with the chemical formula $CaSO_4.2H_2O$. Magnesium sulfate ($MgSO_4$) is often encountered as the heptahydrate epsomite ($MgSO_4.7H_2O$), commonly called Epsom. Kieserite is an unstable magnesium sulfate mineral ($MgSO_4.H_2O$). In embodiments, the method for treating contaminated groundwater is effective for groundwater that contains sulfate reducing micro-organisms.

In one embodiment, the electron acceptor salt that is applied to the ground surface includes nitrate, e.g. $NO_3^-$, generally in the form of at least one soluble nitrate salt. Inorganic nitrate salts that are at least partially soluble in water or in aqueous solution are suitable sources of the electron acceptor salt. Representative soluble nitrates that are suitable sources of nitrate include sodium nitrate, calcium nitrate, magnesium nitrate, ferrous nitrate, ferric nitrate and ammonium nitrate.

Selection of the type of electron acceptor salt for a particular application depends, at least in part, on local conditions. For example, relative populations of micro-organisms which are either naturally present in the contaminated groundwater, or are inoculated into the groundwater for bioremediation, may dictate the choice of the electron acceptor salt used, whether it be sulfate, nitrate, any of the other salts that are suitable in the process, or a mixture of these. In one embodiment, the electron acceptor salt includes a mixture of nitrate and sulfate salts, in a weight ratio of nitrate to sulfate in the range from 1:99 to 99:1.

The electron acceptor salt may be applied to the ground surface as a solid or dissolved or slurried in a liquid. In solid form, it may be applied as received, or reduced in size by one or more comminution processes prior to application. In embodiments, and particularly for small application areas, application may be done by hand or using a hand-held applicator. Mechanical applicators, including motorized applicators, are useful for larger application areas. The process of application generally follows accepted practices for dust control, worker safety and minimal environmental impact. Liquid application generally involves dissolving or slurrying the electron acceptor salt in a liquid. Water or an aqueous solution are suitable solvents for liquid application. The concentration of the solution is not critical, so long as sufficient of the electron acceptor salt is applied to the ground surface to remediate the contaminated groundwater, while avoiding excessive runoff of the liquid from the ground surface to be treated.

In general, sufficient electron acceptor salt is applied to the ground surface to cause an increase in the amount of electron acceptor salt in the contaminated groundwater. In the presence of sulfate reducing micro-organisms in the contaminated groundwater, increasing the sulfate content in the groundwater has the effect of increasing the rate of microbial destruction of the contaminants. Likewise, in the presence of nitrate reducing micro-organisms in the contaminated groundwater, increasing the nitrate content in the groundwater has the effect of increasing the rate of microbial destruction of the contaminants. The amount of electron acceptor salt that is added to contaminated groundwater is, at least in part, a site-specific variable. Considerations such as, for example, the quantity and type of contamination, the quantity of available active micro-organisms, the depth of the groundwater, the soil type in the region of the aquifer, the proximity of the contamination plume to drinking water supplies may be used in determining the treatment level of the electron acceptor salt. In one embodiment, the electron acceptor salt content in the contaminated groundwater is increased to a concentration of at least 20 mg per liter of contaminated groundwater. In the case of a sulfate electron acceptor salt, the concentration of the salt is based on the weight of $SO_4^{2-}$ per liter of contaminated groundwater. Likewise, in the case of a nitrate electron acceptor salt, the concentration of the salt is based on the weight of $NO_3^-$ per liter of contaminated groundwater. In embodiments, a first electron acceptor salt concentration in the contaminated groundwater within a plume of contamination in an aquifer is increased to a concentration that is at least as high as a second electron acceptor salt concentration in a portion of uncontaminated groundwater within the same aquifer. In one embodiment, the electron acceptor salt concentration in the contaminated groundwater is in a range from 20 mg per liter to 5000 mg per liter of groundwater during at least a portion of the bioremediation process. In another embodiment, the electron acceptor salt concentration in the contaminated groundwater is in a range from 100 mg per liter to 2500 mg per liter of groundwater during at least a portion of the bioremediation process.

In embodiments, the electron acceptor salt that is applied to the ground surface percolates through the vadose zone soils above the aquifer, and into the contaminated groundwater in the aquifer, by natural means. In regions of high rainfall, surface recharge via natural rainfall alone may be sufficient to cause the electron acceptor salt to migrate from the ground surface on which it is applied into the contaminated groundwater. In other embodiments, the process includes a step of irrigating the ground surface having the applied electron acceptor salt. With this step, irrigation is used to urge the electron acceptor salt into the contaminated groundwater. Typical methods for irrigating the ground surface are useful in the process, including sprinkling irrigation or flood irrigation or both. The irrigation step is conducted for at least sufficient time to increase the electron acceptor salt concentration in at least a portion of the contaminated groundwater. In one embodiment, the irrigation step provides at least 20 mg of electron acceptor salt per liter of contaminated groundwater. In embodiments, the irrigation step provides sufficient water or an aqueous solution to the ground surface to at least equal an amount of precipitation that is expected to fall on the site over 4 to 7 days based on a historical maximum monthly rainfall intensity. Construction of berms, dams or other barriers to flow may be used on the site to minimize runoff from the site during irrigation.

During bioremediation of contaminated groundwater, the process also provides for bioremediation of contaminated vadose zone soils between the ground surface and the aquifer, as the electron acceptor salt passes through the zone to the region of contaminated groundwater below.

In a specific embodiment, a vacant site with no surface infrastructure, which is overlying contaminated groundwater, is selected for treatment. Historical groundwater data indicate that sulfate is depleted in the impacted groundwater. Gypsum, as a source of sulfate, at an application rate of between 40-60 lb per 200 ft² is applied to the site using a spreader that is normally used for spreading fertilizer. The site is then irrigated with water, using a conventional sprinkler system, for a period of 4-7 days. The amount of water used for irrigation is based on the historic maximum monthly precipitation rate for that site.

In another specific embodiment, the treatment is repeated on a similar site, with heptahydrate epsomite being used as a sulfate source, at an application rate of 0.5 lbs per 200 ft².

In another specific embodiment, the treatment is repeated on a similar site, with calcium nitrate being used as a nitrate source, at an application rate of 20 lbs per 200 ft².

EXAMPLES

A vacant site, with no surface infrastructure, overlying contaminated groundwater, was selected for treatment. The aquifer at this site had a hydraulic conductivity of greater than $10^{-3}$ cm/sec. At this site, 650 pounds of gypsum was land applied to a 50 ft×50 ft area of the site, and irrigated with 25,000 gal of water over 8 days. Following this application, groundwater from the monitoring wells in the pilot area was periodically sampled. These wells included a shallow well at a depth of 1.5 to 8.5 ft below ground surface and an intermediate well at 8.5 ft to 13.5 ft below ground surface. Water samples from each level were periodically analyzed for sulfate, aromatics and total petroleum hydrocarbons (TPH, typically in the $C_6$ to $C_{12}$ range) to evaluate the effectiveness of the land application in delivering sulfate to the groundwater and its impact on contaminant concentrations.

FIG. 1 shows the changes in sulfate, aromatics and TPH concentrations in the shallow well following land application of gypsum and the associated irrigation event. FIG. 1 also shows the rainfall over the same time period. Each rainfall datum point in FIG. 1 (and FIG. 2) represents the monthly total rainfall on the site for the reporting period. The sulfate concentration in the shallow well rapidly increased to a concentration of slightly more than 1000 mg/l after the sulfate surface application. Over the course of the first 400 days, the sulfate concentration gradually decreased to roughly 100 mg/l. Over that same period, the aromatic concentration in the ground water decreased significantly, as did the TPH concentration. At slightly more than 400 days into the test, the site was subjected to 8.9" of rainfall over two days. The increased inflow of runoff into the contaminated aquifer diluted the sulfate concentration and caused a increase in both aromatic and TPH concentrations. However, this incident had only a temporary effect; the sulfate level began increasing again in the aquifer in the next sample period, with the associated decrease in both aromatic and TPH levels.

Figure 2:
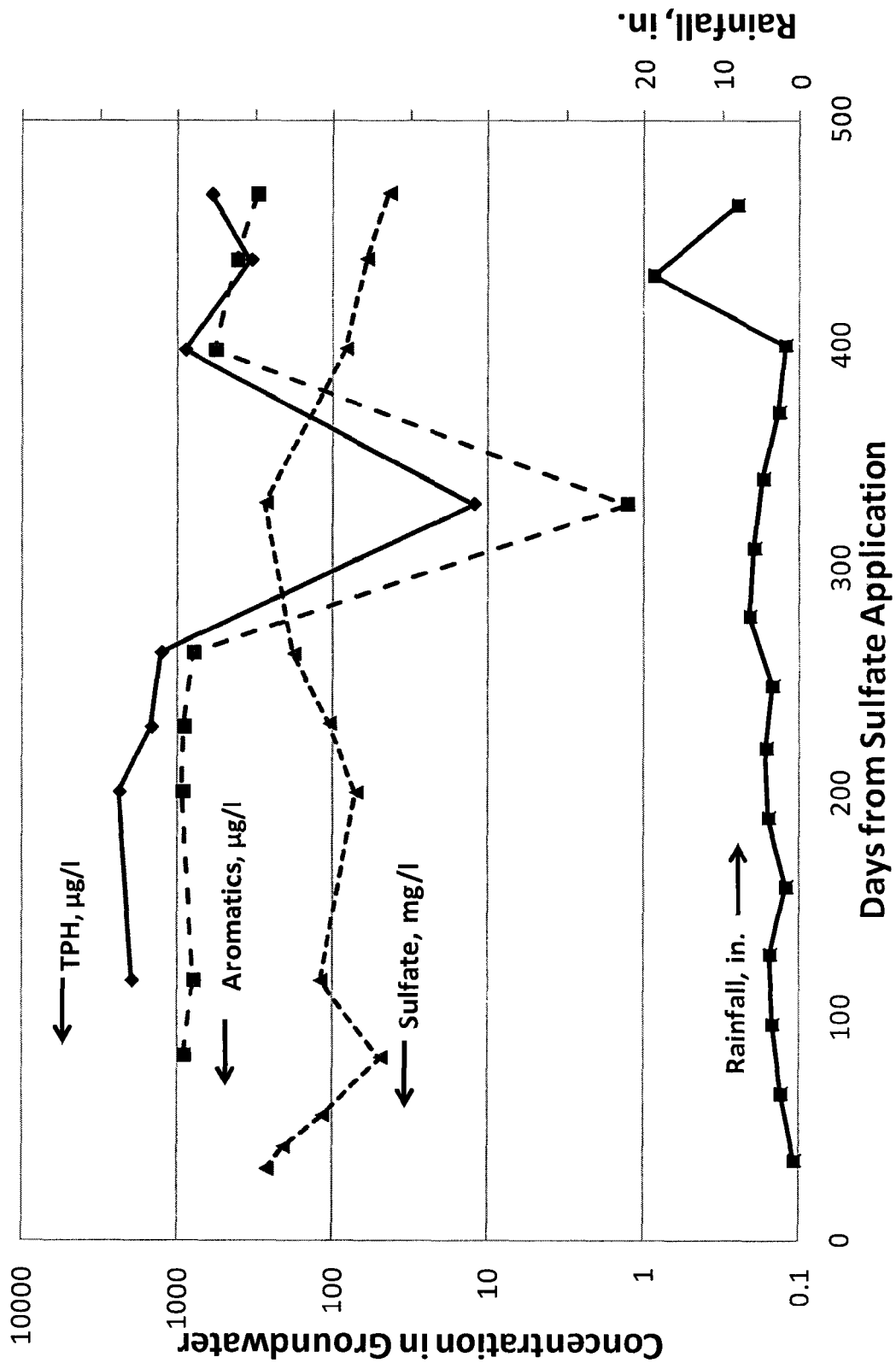
FIG. 2 illustrates the changes in groundwater composition in an intermediate depth well following application of sulfate to the ground surface overlying contaminated groundwater.

FIG. 2 shows the changes in sulfate, aromatics and TPH concentrations in the intermediate well following the land application of gypsum and the associated irrigation event, along with the rainfall over the same time period. As seen in FIG. 2, both the TPH and aromatic concentrations were reduced following the sulfate treatment. The amount of added sulfate in the groundwater had a significant effect on both TPH and aromatic concentrations. At sulfate concentrations around 100 mg/l, both TPH and aromatic concentrations were reduced in the groundwater. At sulfate levels below 100 mg/l, the effect was smaller. It is believed that the sulfate concentration at those conditions was not conducive to building a robust sulfate reducing bacteria population. And as with the shallow well, the quality of the contaminated water at the intermediate level was significantly impacted by the large rainfall at slightly more than 400 days into the test.

Figure 3:
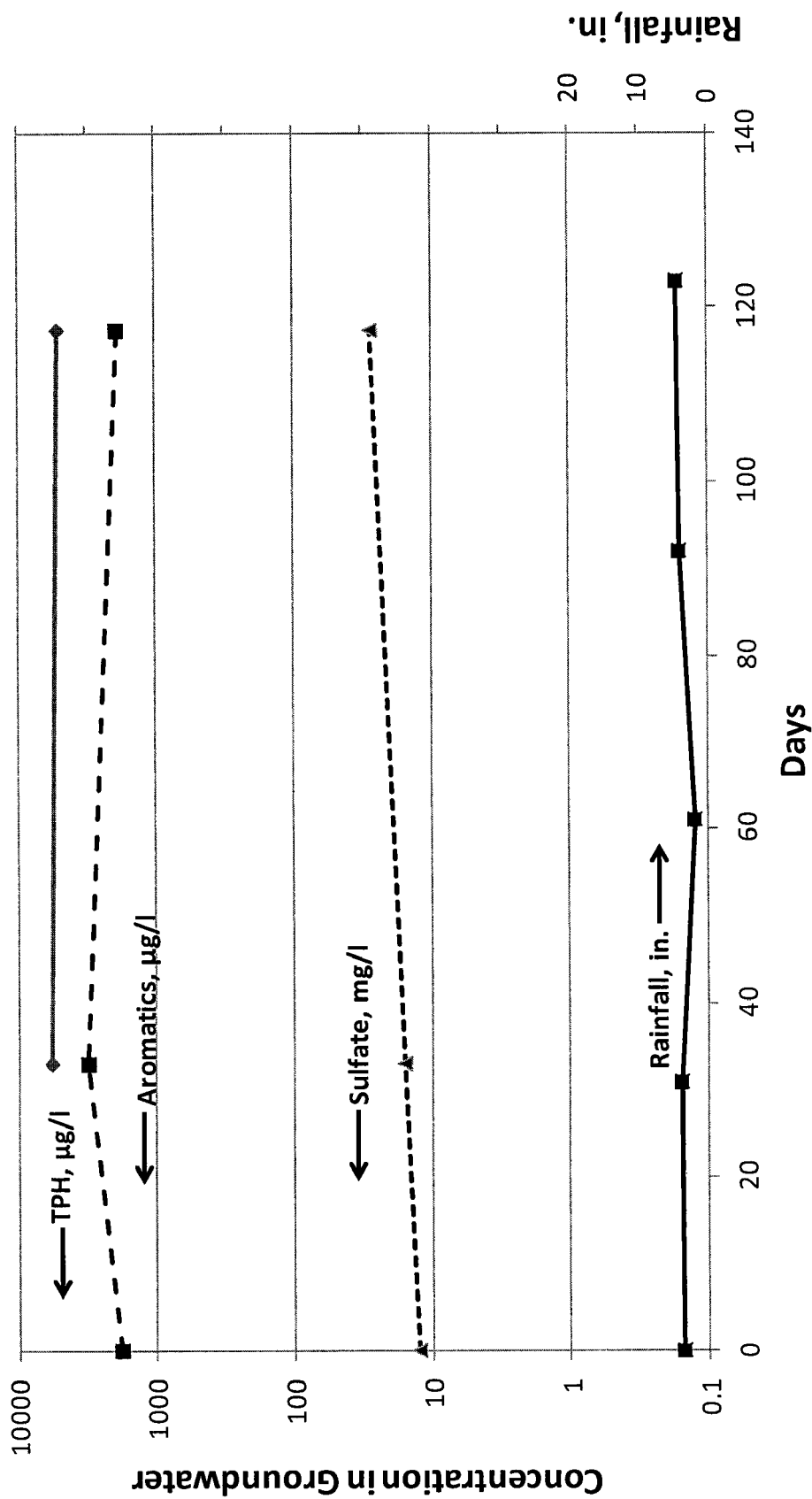
FIG. 3 illustrates that the composition of groundwater did not change significantly in a control test, in the absence of added sulfate to the ground surface.

FIG. 3 illustrates the results of a control test. In the control, a control plot was subjected to the same amount of irrigation over a similar 50 ft×50 ft area, without sulfate addition. Over the test, the sulfate concentration in the groundwater changed only slightly, indicating that very little additional sulfate was present in vadose zone soils overlying the groundwater at that site. As a result, there was virtually no change in either the benzene concentration or the TPH concentration during the control test.

Figure 4:
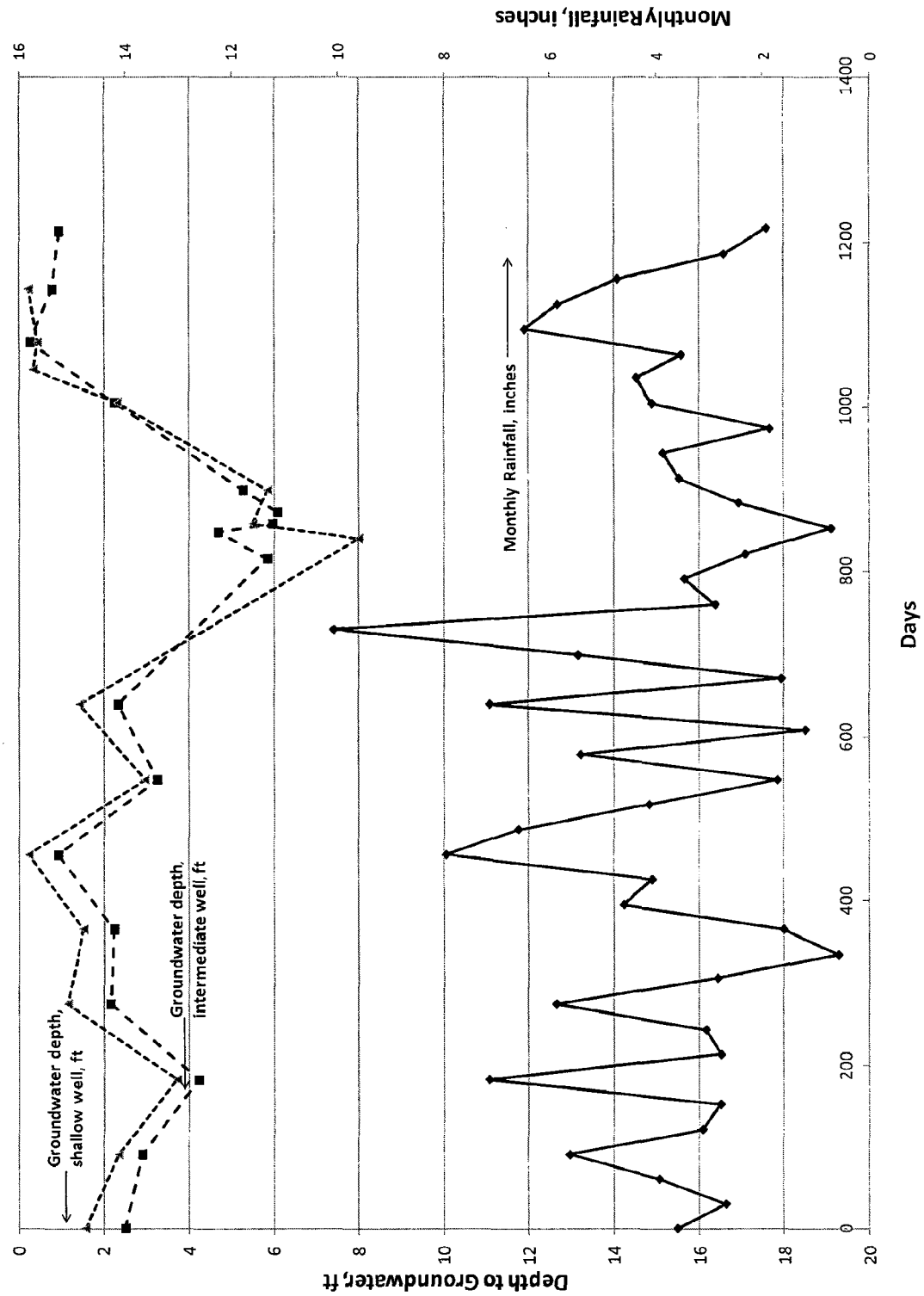
FIG. 4 illustrates a positive relationship between rainfall amount and water level in an aquifer in a test plot that may be treated as described herein.

FIG. 4 illustrates the relationship between groundwater level and rainfall in a representative plot. A qualitative positive correlation between the water level (i.e. depth to water level) and rainfall for this plot indicates a qualitative measure of success in getting the electron acceptor laden water to infiltrate to the groundwater in this plot, and therefore a positive indication of the effectiveness of the surface treatment for mitigating contamination of the groundwater in this plot.

What is claimed is:

1. A process for bioremediating contaminated groundwater in a subsurface aquifer, comprising:
    applying at least one electron acceptor salt to a ground surface overlying the contaminated groundwater; and
    increasing a first concentration of the at least one electron acceptor salt in the contaminated groundwater within a plume of contamination in an aquifer to at least as high as a second concentration of the at least one electron acceptor salt in a portion of uncontaminated groundwater within the same aquifer.

2. The process according to claim 1, wherein the aquifer has a hydraulic conductivity of $10^{-3}$ cm/sec or higher.

3. The process according to claim 1, wherein the aquifer has a hydraulic conductivity within the range of from $10^{-3}$ cm/sec to 1 cm/sec.

4. The process according to claim 1, wherein the contaminated groundwater that is bioremediated ranges in depth from 5 feet to 25 feet below the ground surface.

5. The process according to claim 1, wherein the contaminated groundwater contains at least 1 mg total BTEX per liter of contaminated groundwater.

6. The process according to claim 5, wherein the contaminated groundwater contains in the range from 1 to 10 mg of total BTEX per liter of groundwater.

7. The process according to claim 1, wherein the contaminated groundwater contains less than 20 mg of the electron acceptor salt per liter of contaminated groundwater prior to application of the at least one electron acceptor salt.

8. The process according to claim 1, further comprising applying a sufficient amount of the electron acceptor salt to the ground surface to produce an electron acceptor salt concentration in the contaminated groundwater of at least 20 mg per liter of contaminated groundwater.

9. The process according to claim 1, wherein applying the at least one electron acceptor salt to the ground surface overlying the contaminated groundwater comprises applying a sufficient amount of the at least one electron acceptor salt to the ground surface to produce an electron acceptor salt concentration in the contaminated groundwater in the range from 20 mg per liter to 5000 mg per liter of contaminated groundwater.

10. The process according to claim 1, wherein the at least one electron acceptor salt is a soluble sulfate salt.

11. The process according to claim 10, wherein the soluble sulfate salt comprises gypsum.

12. The process according to claim 10, wherein the soluble sulfate salt comprises heptahydrate epsomite.

13. The process according to claim 1, wherein the at least one electron acceptor salt is a soluble nitrate salt.

14. The process according to claim 13, wherein the soluble nitrate salt is calcium nitrate.

15. The process according to claim 1, further comprising increasing the first electron acceptor salt concentration in the contaminated groundwater to a range from 20 mg per liter to 5000 mg per liter of contaminated groundwater.

16. The process according to claim 1, further comprising irrigating the ground surface having the applied electron acceptor salt.

17. The process according to claim 16, further comprising irrigating the ground surface with sufficient water or an aqueous solution to at least equal an amount of precipitation that is expected to fall on the site over 4 to 7 days based on a historical maximum monthly rainfall intensity.

18. A process for bioremediating contaminated groundwater in a subsurface aquifer which includes both contaminated groundwater and uncontaminated groundwater, comprising:
    a. determining a sulfate concentration of a sample of the uncontaminated groundwater;
    b. determining a sulfate concentration of a sample of the contaminated groundwater; and
    c. applying at least one sulfate salt to the ground surface overlying the contaminated groundwater in sufficient quantity to increase the sulfate concentration in the contaminated groundwater to at least 20 mg per liter of the contaminated groundwater.

19. The process according to claim 18, further comprising applying at least one sulfate salt to the ground surface overlaying the contaminated groundwater in sufficient quantity to increase the sulfate concentration in the contaminated ground water to at least equal to the sulfate concentration of the uncontaminated groundwater.

20. The process according to claim 18, further comprising applying at least one electron acceptor salt to the ground surface overlaying the contaminated groundwater in sufficient quantity to increase the sulfate concentration of the contaminated ground water to within a range from 20 mg per liter to 5000 mg per liter of contaminated groundwater.

21. A process for bioremediating contaminated groundwater in a subsurface aquifer, comprising:
    a. identifying an aquifer with contaminated groundwater which contains less than 20 mg of sulfate per liter of contaminated groundwater, in an aquifer having a hydraulic conductivity within the range from $10^{-3}$ cm/sec to 1 cm/sec, the contaminated groundwater being at a depth in the range from 5 feet to 25 feet below the ground surface;
    b. selecting a ground surface overlying the contaminated groundwater; and
    c. supplying at least one electron acceptor salt to the ground surface.

22. The process according to claim 21, wherein the at least one electron acceptor salt is sulfate.

23. The process according to claim 21, wherein the at least one electron acceptor salt is gypsum.

24. The process according to claim 21, wherein the at least one electron acceptor salt is heptahydrate epsomite.

25. A process for bioremediating contaminated groundwater in a subsurface aquifer, comprising:
   applying at least one electron acceptor salt to a ground surface overlying the contaminated groundwater,
   wherein the contaminated groundwater that is bioremediated ranges in depth from 5 feet to 25 feet below the ground surface.

\* \* \* \* \*